United States Patent
Raghunathan et al.

(10) Patent No.: US 10,750,416 B1
(45) Date of Patent: Aug. 18, 2020

(54) PROACTIVE HANDOVER IN RESPONSE TO PREDICTION OF PRECIPITATION

(71) Applicant: Sprint Spectrum L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/386,033

(22) Filed: Apr. 16, 2019

(51) Int. Cl.
*H04W 36/00* (2009.01)
*H04W 64/00* (2009.01)
*H04B 7/155* (2006.01)

(52) U.S. Cl.
CPC .. *H04W 36/00837* (2018.08); *H04B 7/15528* (2013.01); *H04W 36/0007* (2018.08); *H04W 36/0069* (2018.08); *H04W 64/006* (2013.01)

(58) Field of Classification Search
CPC ...... H04B 7/024; H04B 17/309; H04B 17/11; H04B 17/345; H04B 1/525; H04B 17/24; H04B 17/26; H04B 17/382; H04B 1/0007; H04B 10/25753; H04B 17/318
See application file for complete search history.

(56) References Cited

U.S. PATENT DOCUMENTS

| | | | |
|---|---|---|---|
| 5,519,618 A | 5/1996 | Kastner et al. | |
| 6,308,043 B1 | 10/2001 | Solheim et al. | |
| 10,051,542 B1 | 8/2018 | Mansour et al. | |
| 2014/0064158 A1* | 3/2014 | Timus | H04W 36/30 370/279 |
| 2015/0195730 A1 | 7/2015 | Siomina et al. | |
| 2016/0165605 A1 | 6/2016 | Dimou et al. | |
| 2016/0242098 A1 | 8/2016 | Tsukamoto | |
| 2019/0320361 A1* | 10/2019 | Uchiyama | H04W 36/305 |

* cited by examiner

*Primary Examiner* — Natasha W Cosme (57) ABSTRACT

While a device is served on a first wireless connection on a first carrier that has a first center frequency, a determination will be made that a threshold high probability of precipitation is forecast for a location of the first wireless connection. In response to at least that determination, but before the forecast precipitation occurs, the device will then be reconfigured from being served on the first wireless connection on the first carrier to instead being served on a second wireless connection on a second carrier that has a second center frequency lower than the first center frequency, with the reconfiguring being based on the second center frequency being lower than the first center frequency. Proactively switching the device to a lower carrier based on the prediction of precipitation may help to minimize rain fade and associated issues.

20 Claims, 4 Drawing Sheets

WHILE A RELAY IS OPERATING WITH A FIRST WIRELESS BACKHAUL CONNECTION ON A FIRST CARRIER THAT HAS A FIRST CENTER FREQUENCY, DETERMINE THAT A THRESHOLD HIGH PROBABILITY OF PRECIPITATION IS FORECAST FOR A LOCATION OF THE FIRST WIRELESS BACKHAUL CONNECTION — 42

RESPONSIVE TO AT LEAST THE DETERMINING THAT THE THRESHOLD HIGH PROBABILITY OF PRECIPITATION IS FORECAST FOR THE LOCATION OF THE FIRST WIRELESS BACKHAUL CONNECTION, BUT BEFORE THE FORECAST PRECIPITATION OCCURS, RECONFIGURE THE RELAY FROM OPERATING WITH THE FIRST WIRELESS BACKHAUL CONNECTION ON THE FIRST CARRIER TO INSTEAD OPERATING WITH A SECOND WIRELESS BACKHAUL CONNECTION ON A SECOND CARRIER THAT HAS A SECOND CENTER FREQUENCY LOWER THAN THE FIRST CENTER FREQUENCY, THE RECONFIGURING BEING BASED ON THE SECOND CENTER FREQUENCY BEING LOWER THAN THE FIRST CENTER FREQUENCY — 44

PROACTIVE HANDOVER IN RESPONSE TO PREDICTION OF PRECIPITATION

BACKGROUND

A typical wireless communication system includes one or more base stations, each radiating to define one or more coverage areas, such as cells and cell sectors, in which wireless client devices (UEs) such as cell phones, tablet computers, tracking devices, embedded wireless modules, and other wirelessly equipped communication devices (whether or not user operated), can operate. In turn, each base station could sit as a node on a core network that includes entities such as a network controller and a gateway system that provide packet-data-network connectivity. With this arrangement, a UE within coverage of the system could thus engage in air interface communication with a base station and thereby communicate via the base station with various remote network entities or with other UEs served by the system.

Such a network could operate in accordance with a particular radio access technology, with communications from the base stations to UEs defining a downlink or forward link and communications from the UEs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the radio access technology, each base station could be configured to operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could have an associated center frequency and a bandwidth defining a width of frequency.

On the downlink and uplink, each such carrier could be structured to define various physical channels and air-interface resources for carrying information between the base stations and UEs. For instance, on the downlink, each carrier could define a reference channel on which the base station broadcasts a reference signal that UEs can evaluate to determine coverage strength, one or more downlink control channels for carrying control signaling from the base station to UEs, and one or more downlink traffic channels for carrying bearer communications from the base station to UEs. And on the uplink, each carrier could define one or more uplink control channels for carrying control signaling from UEs to the base station and one or more uplink traffic channels for carrying bearer communications from UEs to the base station.

When a UE initially powers on within such a system, the UE could scan various carriers in search of coverage, and upon detecting strong enough coverage of a base station, the UE could engage in signaling to establish a Radio Resource Control (RRC) connection with the base station and could then engage in an attach process if appropriate to register for service with the system and prepare the system to serve the UE.

In an example attach process, the UE could transmit an attach request over the air to the base station, and the base station could forward the attach request to the core-network controller for processing. And after authenticating and authorizing the UE, the network controller could then engage in signaling with the base station and with the gateway system, to coordinate establishment of a bearer (data tunnel) that that extends between the UE and the gateway system and defines an access point name (APN) connection associated with external transport-network connectivity. Further, a Dynamic Host Control Protocol (DHCP) server could assign to the UE an Internet Protocol (IP) address usable by the UE to engage in packet-data communication on the external transport network. And the base station and various core-network entities could each create and store a context record for the UE, identifying the UE's network connection, bearer identity, and other information to facilitate serving the UE.

Once a UE is so connected and attached, the base station could then provide the UE with wireless data communication service. For instance, when data arrives on the transport network destined to the UE's IP address, the gateway system could transmit the data via the UE's bearer to the base station, and the base station could then schedule downlink air interface resources to carry the data to the UE and transmit the data to the UE accordingly. Likewise, when the UE has data to transmit on the transport network, the UE could send a scheduling request to the base station, the base station could schedule uplink air interface resources to carry the data from the UE, and upon receipt of the data at the base station, the base station could then transmit the data via the UE's bearer to the gateway system for output onto the transport network.

These wireless communications between the UE and the base station could be carried out using a modulation and coding scheme (MCS) that is selected based on a quality of the air interface between the UE and the base station, with the MCS defining an effective data rate of the communications. For instance, if the UE is in relatively strong coverage of the base station, the base station could coordinate use of a relatively high-order MCS that will provide the UE with relatively high throughput. Whereas, if the UE is in relatively weak coverage of the base station, then the base station could coordinate use of a relatively low-order MCS that will provide the UE with relatively low throughput.

OVERVIEW

Optimally, a wireless service provider will strategically implement base stations throughout a market area so that served UEs can move between the base stations' coverage areas without loss of coverage. Each base station could include an antenna structure and associated equipment, and the wireless service provider could connect each base station by a landline cable (e.g., a T1 line) with the service provider's core network, to enable the base station to communicate with the network controller, the gateway system, other base stations, and the like.

It may be impractical, however, for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or otherwise undesirable to run landline cables to every one of those small-cell base stations.

To provide coverage in these or other scenarios, the service provider could instead implement relays, each of which could be configured to operate in much the same way as a conventional landline-connected base station but could have a wireless backhaul connection to the core network. In particular, each relay could include a relay-base-station component configured to serve UEs much like a landline-connected base station would and a relay-UE component (e.g., connected with or integrated with the relay-base-station component) configured to be served by a landline-connected base station or other base station, referred to as a donor base station. The air interface between the relay-UE and the donor base station would thus define a wireless backhaul connection for the relay.

When the relay-UE component of a relay first powers on within the system, the relay-UE could operate in much the same way as the UE described above, scanning various carriers in search of base station coverage, and upon detecting strong enough coverage, engaging in signaling to connect with the base station. But because the relay-UE is a relay-UE rather than a conventional UE, the relay-UE could then engage in special attach processes through which the system would become configured to provide both the relay-UE and the associated relay-base-station with core-network connectivity, perhaps through a dedicated core-network relay-gateway system.

For instance, the relay-UE could engage in a first attach process in which the relay-UE identifies itself as a relay-UE (such as by designating a special Public Land Mobile Network (PLMN) identifier or the like) that could result in (i) the core network establishing for the relay-UE of a first APN connection with the relay-gateway system and assigning to the relay-UE an internal-core-network IP address, and (ii) creation and storage at various core network entities of a context record for the relay-UE. And when the associated relay-base-station component of the relay has powered on, the relay-UE could engage in another attach process that could result in the core network establishing for the relay-UE a second APN connection with the relay-gateway system, and assignment of an internal-core-network IP address for use by the relay-base-station.

Once a relay is so connected on at least one carrier with a serving donor base station, the relay-base-station component of the relay could then serve UEs in much the same way as a conventional base station would. But all associated control-plane and user-plane communications between the relay-base-station and the core network could flow over the wireless backhaul connection between the relay-UE and the donor base station.

For instance, whenever control signaling would flow from a core-network entity to the relay-base-station, that control signaling could flow via the relay-gateway system to the donor base station, the donor base station could coordinate transmission of that control-signaling as a bearer-data communication to the relay-UE on the relay-UE's serving carrier, and the UE-relay could then pass the communication to the relay-base station for processing. And whenever control signaling would flow from the relay-base station to a core-network entity, the relay-base station could pass that signaling as a bearer-data communication to the relay-UE, the donor base station could coordinate uplink transmission of that communication on the relay-UE's serving carrier, and the donor base station could pass the communication through the relay-gateway system to the destination core-network entity for processing.

And likewise, whenever the core-network gateway system receives data destined to the IP address of an end-user UE that is served by the relay-base-station, that data could flow via the relay-gateway system to the donor base station, the donor base station could coordinate transmission of the data to the relay-UE on the relay-UE's serving carrier, and the relay-UE could pass the data to the relay-base station, which can then schedule and provide downlink transmission of the data to the end-user UE. And whenever such an end-user UE has data to transmit on an external transport network, the relay-base-station could coordinate uplink transmission of that data from the end-user UE and could pass the data to the relay-UE, the donor base station could coordinate uplink transmission of that communication on the relay-UE's serving carrier, and the donor base station could pass the communication through the relay-gateway system to the conventional gateway system for output onto the transport network.

In a representative system like this, when a relay-UE scans for coverage on which to connect, the relay-UE may be within coverage of multiple carriers that are each strong enough to support a connection. To select a carrier on which to connect in this situation, the relay-UE could make use of carrier-prioritization data that indicates relative prioritization of various carriers. For instance, the relay-UE could detect coverage of multiple carriers that are each sufficiently strong and could then select the carrier that is has the highest indicated priority. Or the relay-UE could scan for coverage of carriers in order of their indicated priority, from highest priority down, and could select the first such carrier that has sufficiently strong coverage.

Such carrier-prioritization data could be configured to prioritize carriers based on their bandwidth, giving higher priority to wider carriers on grounds that wider carriers could support higher peak data rate. Especially for a relay-UE, prioritizing use of wider carriers could be beneficial, as the wireless backhaul connection between a relay-UE and a donor base station may need to support user-plane communications with potentially many UEs served by an associated relay base station, as well as control-plane communications with the relay base station.

By way of example, consider a relay-UE that operates with 5G NR. Under current specifications, 5G NR supports carriers that fall within two frequency ranges: (i) sub-6-GHz, ranging from 450 MHz to 6 GHz and supporting a maximum bandwidth of 100 MHz, and (ii) millimeter-wave, ranging from 24.25 GHz to 52.6 GHz and supporting a maximum bandwidth of 400 MHz. In practice, the relay-UE may be set to prioritize millimeter-wave carriers over sub-6 carriers, because millimeter-wave carriers would likely have wider bandwidth. Therefore, when a relay-UE is within sufficiently strong coverage of both Sub-6-GHz carrier and a millimeter-wave carrier, the relay-UE may connect and operate on the millimeter-wave carrier.

Unfortunately, however, a technical problem with operation on such a high-frequency carrier is that the carrier may be especially susceptible to rain fade. Rain fade occurs when there is significant precipitation (such as rain, fog, snow, or hail) in the RF signal path, with the precipitation absorbing the signals and therefore resulting in reduced signal strength.

And rain fade is more of a problem at higher frequencies, particularly frequencies over 11 GHz.

Therefore, if a relay-UE is operating on a millimeter-wave carrier and significant precipitation occurs within the communication path between the relay-UE and its donor base station, communications between relay-UE and the donor base station could experience rain fade. This rain fade may therefore result in decreased throughput on the relay's wireless backhaul connection, which could significantly impact user experience for UEs served by the relay.

One way to help address this problem is to detect that threshold high precipitation exists in the wireless backhaul path and to then responsively switch the relay-UE from being connected on a high-frequency carrier (e.g., a millimeter-wave carrier) to being connected instead on a low-frequency carrier (e.g. a sub-6-GHz carrier). Switching the relay-UE to a lower-frequency carrier could help minimize rain fade, which could help facilitate higher throughput on the wireless backhaul connection and possibly improved end-user experience.

Yet this solution may itself suffer from at least two additional technical problems. First, once the threshold high precipitation exists in the wireless backhaul path, rain fade may already exist and associated user-experience issues may therefore already exist. Second, switching the relay-UE from being connected on one carrier to being connected on another carrier may cause temporary disconnection of UEs served by the associated relay base station, which may further impact user experience.

The present disclosure provides an improved solution that may help to address these issues.

In accordance with the disclosure, when a relay is operating with a wireless backhaul connection on a first carrier, a determination will be made that a threshold probability of precipitation is forecast for a location of the wireless backhaul connection. And in response to at least that determination, but before the forecast precipitation occurs (if at all), the relay will be reconfigured from operating with the wireless backhaul connection on the first carrier to instead operating with a wireless backhaul connection on a second carrier, with the reconfiguring being based on the second carrier being lower frequency than the first carrier.

In an example implementation, this process could be carried out during an evening when the relay may be serving few or no UEs, perhaps specifically in response to the relay serving few or no UEs, as that timing could help to minimize the impact that reconfiguring the relay's wireless backhaul connection would have on such relay-served UEs. The process could then involve considering a weather forecast for the day following that evening. And based on that weather forecast indicating that there is a high probability of precipitation for that following day at a location of the wireless backhaul connection (e.g., a location that may encompass at least part of the wireless backhaul connection), the relay could be reconfigured from being connected on a given carrier to instead being connected on a lower-frequency carrier. For instance, if the relay is connected on a millimeter-wave carrier, the relay could be reconfigured to instead be connected on a sub-6-GHz carrier.

Moreover, while this process may be particularly advantageous for a relay, an analogous process could also be applied for a conventional (non-relay) UE. In particular, while such a UE is operating with a wireless connection on a first carrier, a determination could be made that a threshold high probability of precipitation is forecast for a location of that wireless connection. And in response to at least that determination, but before the forecast precipitation occurs, the UE could be reconfigured from operating with the wireless connection on the first carrier to instead operating with a wireless connection on a second carrier, with the reconfiguring being based on the second carrier being lower frequency than the first carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will describe implementation in the context of 5G NR by way of example. It will be understood, however, that the principles disclosed can be applied in other contexts as well, such as in connection with other radio access technologies. Further, even within the context of 5G NR, it will be understood that variations are possible. For instance, elements and functions can be rearranged, reordered, omitted, added, combined, distributed, and/or otherwise modified. It will also be understood that technical operations disclosed as being carried out by one or more entities could be carried out at least in part by a processing unit programmed to carry out the operations or to cause one or more other entities to carry out the operations.

Referring to the drawings, as noted above, FIG. 1 is a simplified block diagram of an example wireless communication system in which various disclosed features can be implemented.

Figure 1:
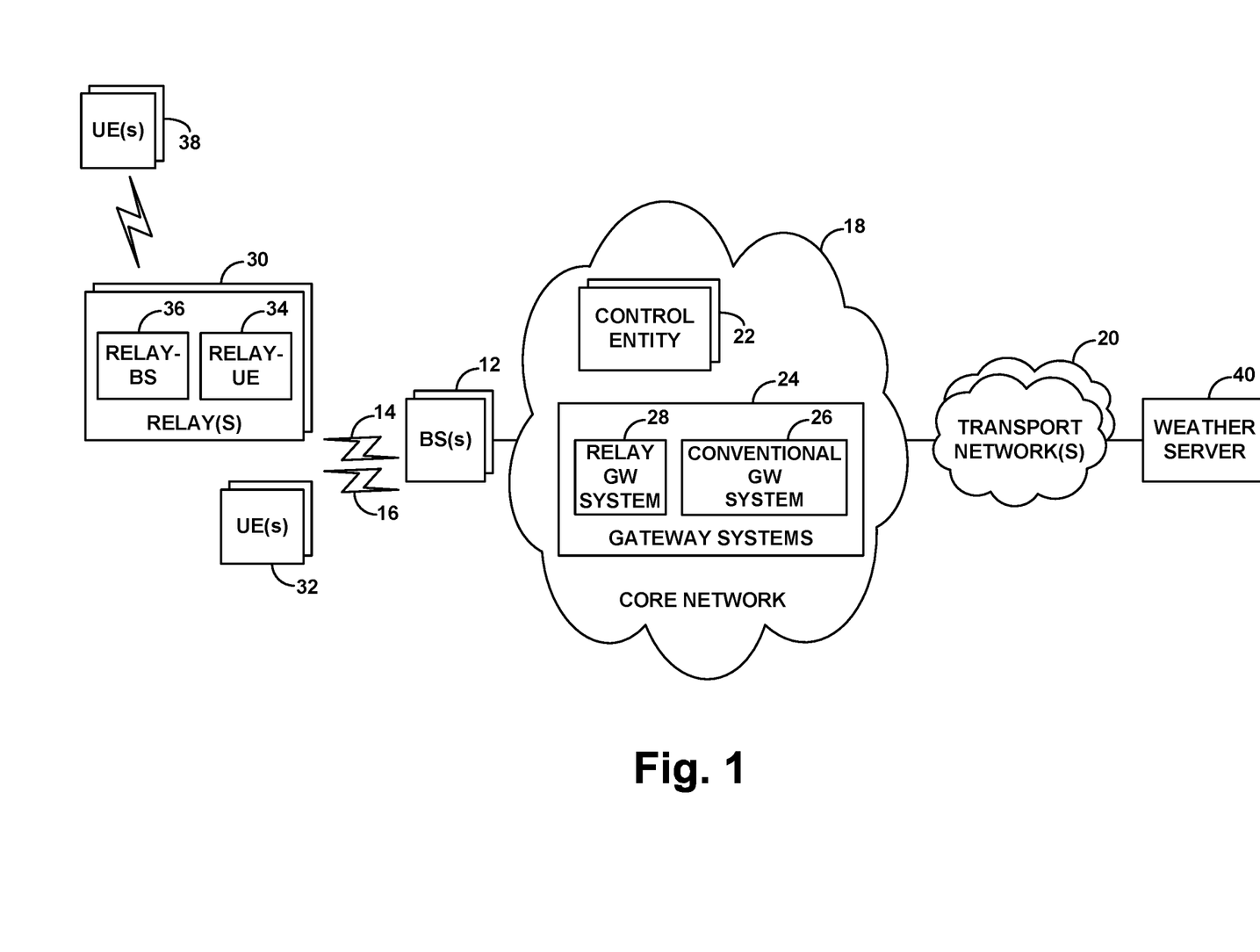
FIG. 1 is a simplified block diagram of a network arrangement in which aspects of the present disclosure can be implemented.

As shown, the example system includes one or more base stations 12 configured to provide service on at least two representative carriers 14, 16. For instance, one base station may provide service on carrier 14, and another base station may provide service on carrier 16, or one base station may provide service on both carriers 14 and 16. In any event, we can assume that coverage on these carriers overlaps, so that a device could be within coverage of both carriers at once and may therefore face a choice of which carrier to operate on. Further, each base station could take various forms, such as a macro base station or a small-cell base station, among other possibilities, including an antenna structure and associated base station components or other equipment.

In practice, each base station 12 could be interfaced with a core network 18, which could provide connectivity with one or more external transport networks 20. The core network could be a packet-switched network, such as an Evolved Packet Core (EPC) network or a Next Generation Core (NGC) network, among other possibilities, allowing packet-based communication between nodes on the core network.

As shown by example, the core network could include one or more control entities 22 (e.g., a Mobility Management Entity (MME), or Access and Mobility Management Function (AMF) and Session Management Function (SMF)), which could provide control functionality such as coordinating attachment, setup of bearers, paging, and other functions. Further, the core network could include multiple gateway systems 24, which could provide network connectivity for served devices. For instance, the core network could include a conventional gateway system 26 (e.g., a Serving Gateway (SGW) and Packet Data Network Gateway (PGW), or a User Plane Function (UPF)), which could provide conventional UEs with connectivity to external transport network(s) 20. And the core network could further include a relay gateway system 28 (e.g., an SGW and a PGW, or a UPF), which could provide relays with internal core-network connectivity.

Shown within coverage of both of the example carriers 14, 16 are then one or more devices that could be served by base station(s) 12 on the carriers. In particular, shown within coverage of the carriers are one or more relays 30 and one or more end-user UEs 32. In line with the discussion above, each relay 30 could include a relay-base-station (relay-BS) 34 and a relay-UE 36, which could be integrated together or could be provided separately and interconnected together, through a direct or local-area-network connection for instance. Further, the relay-BS of each relay could serve one or more conventional UEs 38.

Each of the multiple carriers 14, 16 on which the one or more base station(s) 12 are configured to provide service would have a defined carrier bandwidth and center frequency as noted above, possibly separately for downlink and uplink channels. Further, for present purposes, we can assume that carrier 14 is a relatively low-frequency carrier such as a sub-6 GHz carrier and that carrier 16 is a relatively high-frequency carrier such as a millimeter-wave carrier.

In accordance with the radio access technology, the air interface on each such carrier could be structured to define various air-interface resources to facilitate carrying information between the base station and UEs. For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier could be divided into subcarriers with subcarrier spacing on the order of 15 to 240 kHz. With this arrangement, the air interface on each carrier could thus define an array of resource elements each occupying a subcarrier and symbol time segment, and the base station and UEs could be configured to communicate with each other through modulation of the subcarriers to carry data in those resource elements.

Further, on each carrier particular sets of resource elements on the air interface could be grouped together to define the physical resource blocks (PRBs). In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink of each carrier could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs. Further, in certain subframes, particular resource elements could be reserved for other purposes, such as to carry synchronization signals that UEs could detect as a way to discover coverage of the base station on the carrier and to establish frame timing, and to carry system information messages that could specify various operational parameters. And other resource elements distributed in a predefined pattern throughout the carrier bandwidth per subframe could be reserved to carry reference signals that UEs could measure as a basis to evaluate coverage strength.

And on the uplink, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

In line with the discussion above, when any UE enters into coverage of base station 12, the UE could scan for coverage on various carriers (e.g., at predefined center frequencies) and, upon detecting coverage on one or more carriers, could evaluate the reference signal per carrier to determine coverage strength (e.g., reference signal receive power (RSRP) and/or reference signal receive quality (RSRQ)). The UE could thereby select a carrier that has sufficient coverage strength, and the UE could then engage in random access signaling and RRC signaling to connect with the base station that provides the coverage on that carrier, thus putting the UE in an RRC-connected mode.

Further, if the UE is not yet registered for service with the network, the UE could then engage in attach signaling via the base station with a core-network control entity 22, which could result in setup for the UE of bearer and APN connectivity. And the base station could coordinate establishment for the UE of a corresponding data radio bearer between the UE and the base station and could record the operational state of the UE in a context record for the UE. For instance, the base station could record in the context record an indication that the base station is serving the UE on the particular carrier on which the UE connected.

As explained above, for a conventional (non-relay) UE, this process could result in setup of bearer and APN connectivity with the conventional gateway system 26, to enable the UE to communicate on the external transport network(s) 20. Whereas, for a relay-UE, this process could result in setup of bearer and APN connectivity with the relay-gateway system 28, for providing the relay 30 with access to communicate with other entities in the core network.

For instance, a relay-UE could identify itself as a relay-UE rather than a conventional UE by providing a special PLMN ID in its attach signaling, and this PLMN ID could cause the control entity 22 to coordinate bearer and APN setup for the relay-UE with the relay-gateway system rather than with the conventional gateway system. Further, based on this signaling and/or connectivity, the base station could record in its context record for the relay-UE an indication that the relay-UE is a relay-UE rather than a conventional UE.

Once a UE is so connected and attached, the base station could then serve the UE with data communications as discussed above. For instance, when data arrives at the base station for transmission to the UE, the base station could allocate one or more downlink PRBs for use to carry the data to the UE, and the base station could transmit to the UE a scheduling directive that designates the PRBs and could accordingly transmit the data to the UE in those designated PRBs. And when the UE has data to transmit to the base station, the UE could transmit to the base station a scheduling request, the base station could allocate one or more uplink PRBs for use to carry the data and could transmit to the UE a scheduling directive that designates the PRBs, and the UE could accordingly transmit the data to the base station in those designated PRBs.

As further discussed above, the base station could direct use of a particular MCS for these data transmissions, with the MCS being selected based on quality of the air interface between the base station and the UE. To facilitate this, the UE could periodically evaluate the channel quality and transmit to the base station a control message designating a representative channel quality indicator (CQI) value. The base station could then map a latest such CQI report from the UE to a corresponding MCS, which the base station could designate in its scheduling directive to the UE. And as noted above, lower channel quality such as a weaker signal could map to a lower-order MCS and thus lower effective data rate, whereas higher channel quality such as a stronger signal could map to a higher-order MCS and thus higher effective data rate.

Any such UE, whether a conventional UE or a relay-UE, could be provisioned with carrier-prioritization data as noted above, to enable the UE to select a carrier on which to connect when the UE may be faced with a choice of multiple carriers of sufficient strength. For instance, the UE could be pre-provisioned with this data, or the UE could receive this data in a broadcast message from a last serving base station, among other possibilities.

As noted above, this carrier-prioritization data could by default give higher priority to the relatively high-frequency carrier 16 than to the relatively low-frequency carrier 14. Therefore, given the assumption that the UE is within coverage of both of those carriers, and putting aside other factors such as load for instance, the UE will connect on the higher priority, relatively high-frequency carrier 14.

Such carrier-prioritization data, or other data stored by the UE, could also define which carriers the UE is allowed to scan for when seeking to acquire connectivity. By default, this allowed-carrier data could include both carrier 14 and carrier 16.

While the UE is so connected and operating on carrier 14, the present process could then be implemented, to determine that a threshold high probability of precipitation is forecast for a location of the UE's wireless connection, and, in advance of the occurrence of that predicted precipitation, to responsively switch the UE to be connected instead on the relatively low-frequency carrier 14. This process could be carried out by the UE, by the UE's serving base station, by core-network control entity 22, and/or by one or more other entities.

In practice, an entity carrying out this process could determine a location of the UE's wireless connection and could query a weather server 40 (such as a server provided by the National Weather Service or other organization) to obtain a weather forecast including a probability of precipitation for that location.

The location at issue could be a location area that encompasses at least part of the UE's wireless connection, perhaps a geographically-defined area designated by zip-code, city/state, or latitude/longitude coordinates, among other possibilities. For simplicity, the location could be a geographic area that encompasses at least a portion of the base station's coverage on the carrier, with the portion being sufficient to intersect with at least part of the wireless connection that would exist between the base station and any given UE served by the base station on carrier. Alternatively, the location could be defined more specifically for a UE at issue, accounting for where the UE will be positioned at the time of the forecast period.

The entity could query the weather server through a hypertext transfer protocol (HTTP) request and/or an application programming interface (API), with the query keyed to the location at issue. In response, the entity could thus receive from the weather server a forecast message specifies a probability of precipitation at the location for a forecast period in the near future, such as in the coming hours or in the following day for instance. This probability of precipitation could be specified as a percentage value, with zero percent meaning that no precipitation is forecast for the location during the forecast period, and with a non-zero percent indicating the level of likelihood of precipitation. Generally, the higher the percentage, the greater is the predicted likelihood of precipitation, and perhaps the greater is the amount of precipitation forecast, depending on the data provided.

From this weather forecast, the entity could thus determine whether a threshold high probability of precipitation is forecast for the location of the UE's wireless connection on carrier 16. Here, at issue could be whether the probability of precipitation is higher than a predefined threshold level, with the predefined threshold being set by engineering design to represent high enough likelihood of precipitation or high enough likely extent of precipitation to create rain fade or sufficient rain fade on the carrier. By way of example, the threshold could be a value that is at least 20%.

If the entity determines that a threshold high probability of precipitation is not forecast for the location of the UE's wireless connection on carrier 16, then the UE could continue to operate on that carrier. Whereas, if the entity determines that a threshold high probability of precipitation is forecast for the location of the UE's wireless connection, then the entity could trigger a process to reconfigure the UE so as to transition the UE from operating with the connection on carrier 16 to instead operating with a connection on lower-frequency carrier 14.

If the entity carrying out this process is the UE itself, the UE could engage in this reconfiguration by changing its carrier-prioritization data to give higher priority to carrier 14 than to carrier 16 based on carrier 14 being lower frequency than carrier 16, and by then releasing its connection on carrier 16 and then, per its changed carrier-prioritization data, reconnecting on its carrier 14. For instance, the UE could revise its stored carrier-prioritization data. And the UE could then send to its serving base station an RRC connection-release message (perhaps with a cause-code noting that predicted precipitation is the reason), resulting in release of its connection on carrier 16. The UE could then re-scan for coverage and, per its changed carrier-prioritization data, could connect on carrier 14 instead of carrier 16.

Alternatively or additionally, the UE could change its allowed-carrier data to exclude carrier 16 but to still include carrier 14. That way, when the UE scans for coverage, the UE would not scan for coverage on carrier 16 but would scan for and detect coverage on carrier 14 and could therefore connect on carrier 14 rather than carrier 16.

On the other hand, if the entity carrying out this process is an entity other than the UE, the entity could engage in the reconfiguration by transmitting a message that directly or indirectly causes the UE to so revise its carrier-prioritization data and/or allowed-carrier data and to release and reconnect similarly. For example, if the entity is the core-network control entity 22, that entity could transmit a message (e.g., a page message) to the UE's serving base station, which the base station could forward to the UE, and the UE could respond accordingly. Or if the entity is the UE's serving base station, the base station could transmit the message to the UE directly, and the UE could respond accordingly.

As noted above, this process could advantageously be carried out when the predicted precipitation does not currently exist at the location of UE's wireless connection, to facilitate proactively switching the UE to a lower-frequency carrier in anticipation of the occurrence of the precipitation. For instance, this process could be carried out when it is not currently raining, snowing, or the like in the area between the UE and its serving base station. And the process could operate to proactively switch the UE to a lower-frequency carrier in response to a prediction that precipitation at that location is likely.

In an example implementation of this process with respect to a relay 30, the process could be carried out during an evening maintenance period, i.e., such as in the middle of the night when the relay is relatively unlikely to be providing much if any service. And as noted above, the forecast period could be for the day that follows that evening. Through the process, a determination could thus be made that a high probability of precipitation is forecast for a location of the relay's wireless backhaul connection (e.g., for a location that is between the relay-34 UE and its serving base station). And in response, the relay could be made to switch from being connected on carrier 16 to being connected instead on carrier 14.

Further, in a specific example of this process, the process could apply with respect to one or more relays, based on a weather forecast for a wireless tracking area that encompasses those relays. For example, the core-network control entity 22 could obtain from a weather server an indication of probability of precipitation for the next day for a given such tracking area. And upon determining that the probability of precipitation is threshold high, the control entity could responsively signal to each base station that is within that tracking area. Each such base station could then refer to its context records to identify each UE served by the base station on carrier 16 to cause the UE to switch to be carrier 14.

Still further, the reconfiguring of a UE could be carried out specifically for a relay-UE in response to determining that the relay-UE is a relay-UE rather than another type of wireless communication device. For instance, the relay-UE's serving base station or the MME could refer to context data to determine that the relay-UE is a relay-UE rather than a conventional non-relay UE and could therefore carry out the reconfiguration for the relay-UE.

Yet further, when applying this process with respect to a non-relay UE in particular, it may be useful for the network to also revise carrier-prioritization data (e.g., carrier-reselection-priority data) and/or allowed-carrier data that is broadcast by the base station currently serving the UE or that the base station otherwise provides to the UE. Revising that data to give higher re-selection priority to carrier 14 than to carrier 16, or to exclude carrier 16, could help ensure that, once the UE's connection on carrier 16 is released, the UE will then reconnect on carrier 14 rather than reconnecting on carrier 16. A similar process may also be useful for some implementations with respect to relay-UEs as well.

And still further, note that the switching of a UE from operating on the higher-frequency carrier to operating on the lower-frequency carrier could be just temporary. After making that change, for instance, a later determination could be made that the threshold high probability of precipitation is no longer forecast for the location of the UE's wireless connection, such as that in such precipitation is not forecast for the coming hours or the next day. And in response to that later determination, the UE could be made to revert to connecting on the higher-frequency carrier rather than on the lower-frequency carrier in much the same way as the UE was made to switch from being connected on the higher-frequency carrier to being connected on the lower-frequency carrier.

Note also that principles described herein can be applied in a scenario where a UE is served with carrier aggregation on multiple carriers at once. In that scenario, one of the UE's serving carriers may be deemed the UE's primary serving carrier, and the present process could apply to switch the UE from being connected on a higher-frequency carrier as its primary serving carrier to being connected instead on a lower-frequency carrier as its primary serving carrier.

And in addition, the described principles could be applied in the context of dual-connectivity, such as where a UE is served by a master base station under a first radio access technology and concurrently by a secondary base station under a second radio access technology. In that context, for instance, the master base station may work to reconfigure the UE's secondary connection from being on first carrier to being instead on a second, lower-frequency carrier, in response to a determination that a threshold high probability of precipitation is forecast for the location of the UE's secondary connection.

Figure 2:
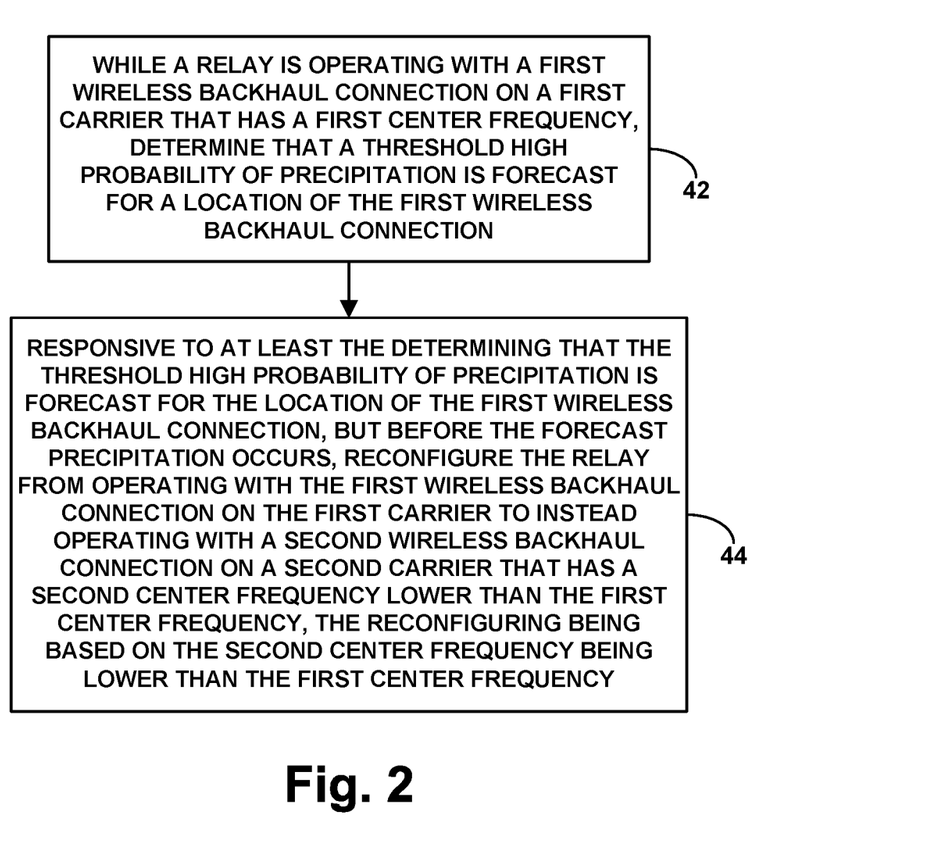
FIG. 2 is a flow chart depicting functions that can be carried out in accordance with the present disclosure.

FIG. 2 is a flow chart depicting a method that could be carried out in accordance with the present disclosure, to control wireless backhaul connectivity of a relay. As noted above, this method could be carried out by the relay, such as by a relay-UE component or other such wireless-client module of the relay that configured to be served with wireless backhaul connectivity for the relay, and/or by one or more other entities.

As shown in FIG. 2, at block 42, the method includes, while the relay is operating with a first wireless backhaul connection on a first carrier that has a first center frequency, determining that a threshold high probability of precipitation is forecast for a location of the first wireless backhaul connection. And at block 44, the method includes, responsive to at least the determining that the threshold high probability of precipitation is forecast for the location of the first wireless backhaul connection, but before the forecast precipitation occurs, reconfiguring the relay from operating with the first wireless backhaul connection on the first carrier to instead operating with a second wireless backhaul connection on a second carrier that has a second center frequency lower than the first center frequency, the reconfiguring being based on the second center frequency being lower than the first center frequency.

In line with the discussion above, this method could be carried out during an evening maintenance period, with the weather forecast being for during the day after that evening maintenance period. Further, at least the reconfiguring could be carried out in response to the relay being a relay (e.g., the UE at issue being a relay-UE) rather than being another type of wireless communication device. And in an example implementation, the first center frequency could be above 24 GHz, and the second center frequency could be below 6 GHz.

Further, as discussed above, the act of reconfiguring the relay from operating with the first wireless backhaul connection on the first carrier to instead operating with the second wireless backhaul connection on the second carrier could involve causing the relay to release the first wireless backhaul connection on the first carrier and then causing the relay to newly establish the second wireless backhaul connection on the second carrier.

Yet further, as noted above, the relay could store carrier-prioritization data that gives higher priority to the first carrier than to the second carrier. And in that case, reconfiguring the relay from operating with the first wireless backhaul connection on the first carrier to instead operating with the second wireless backhaul connection on the second carrier could include causing a change of the carrier-prioritization data to instead give higher priority to the second carrier than to the first carrier. In particular, newly establishing of the wireless backhaul connection on the second carrier could then include, based on the changed carrier-prioritization data, newly establishing the second wireless backhaul connection on the second carrier rather than on the first carrier.

Likewise, as noted above, the relay could store allowed-carrier data indicating carriers that the relay can scan for possible connection acquisition, the allowed-carrier data including the first carrier and the second carrier. And in that case, reconfiguring the relay from operating with the first wireless backhaul connection on the first carrier to instead operating with the second wireless backhaul connection on the second carrier could involve causing a change of the allowed-carrier data to exclude the first carrier.

As further discussed above, the wireless backhaul connectivity of the relay could facilitate operation of the relay on core network that includes a core-network control entity. And in that case, the act of determining that the threshold high probability of precipitation is forecast for the location of the relay could be carried out by at least the core-network control entity, and the reconfiguring the relay from operating with the wireless backhaul connection on the first carrier to instead operating with the wireless backhaul connection on the selected second carrier could involve the core-network control entity transmitting a control message that results in the reconfiguring of the relay.

In an example implementation of this process as discussed above, the location of the relay could be a tracking area that encompasses the relay. And in that case, the act of the core-network control entity transmitting the control message could involve the core-network control entity transmitting the control message to a donor base station that serves the relay, for forwarding by the donor base station to at least the relay.

Further, as discussed above, the act of determining that the threshold high probability of precipitation is forecast for a location of the first wireless backhaul connection could involve querying a weather server to obtain a weather forecast for an area encompassing at least part of the location of the first wireless backhaul connection, receiving the weather forecast from the weather server, and determining based on the received weather forecast that the threshold high probability of precipitation is forecast for the area.

And as discussed above, the act of reconfiguring of the relay could be temporary. Thus, the method could additionally involve subsequently determining that a threshold high probability of precipitation is no longer forecast for the location of the first wireless backhaul connection, and responsive to that subsequent determination, reverting the relay to have wireless backhaul connectivity on the first carrier rather than on the second carrier.

Figure 3:
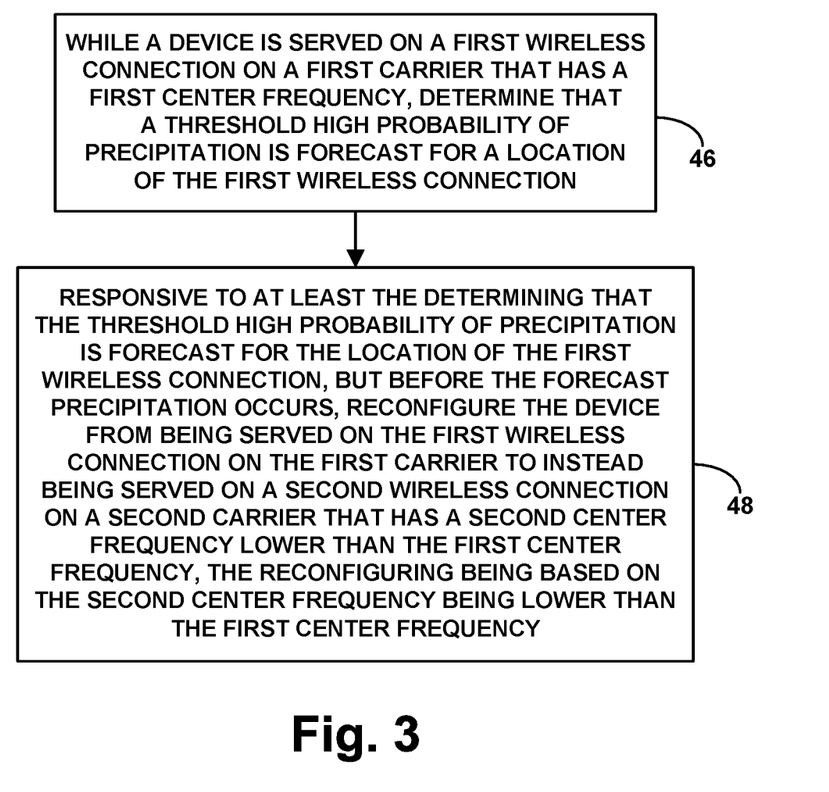
FIG. 3 is another flow chart depicting functions that can be carried out in accordance with the present disclosure.

FIG. 3 is next a flow chart depicting a method for controlling wireless connectivity of a device. As shown in FIG. 3, at block 46, the method involves, while the device is served on a first wireless connection on a first carrier that has a first center frequency, determining that a threshold high probability of precipitation is forecast for a location of the first wireless connection. And at block 48, the method involves, responsive to at least the determining that the threshold high probability of precipitation is forecast for the location of the first wireless connection, but before the forecast precipitation occurs, reconfiguring the device from being served on the first wireless connection on the first carrier to instead being served on a second wireless connection on a second carrier that has a second center frequency lower than the first center frequency, the reconfiguring being based on the second center frequency being lower than the first center frequency.

Various features discussed above can be applied in this context, and vice versa. For instance, first center frequency could be above 24 GHz and the second center frequency could be below 6 GHz. And the reconfiguring could involve changing carrier-reselection-prioritization data that is broadcast to the device, including changing the carrier-reselection-prioritization data from prioritizing the first carrier over the second carrier to instead prioritizing the second carrier over the first carrier.

Figure 4:
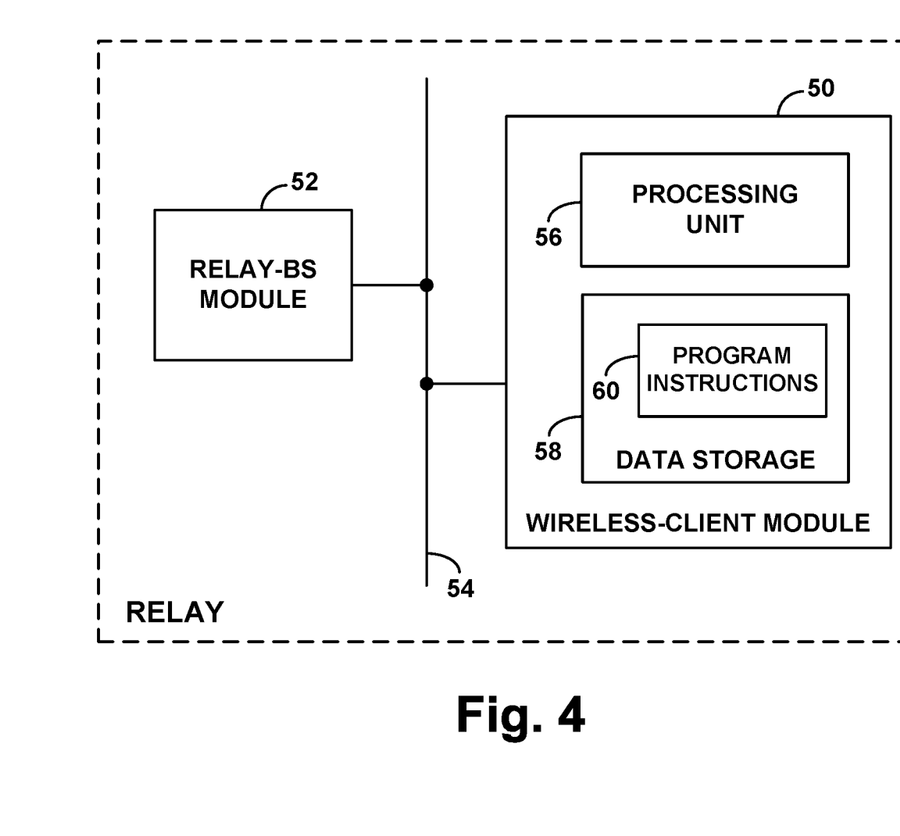
FIG. 4 is a simplified block diagram of a relay operable in accordance with the disclosure.

Finally, FIG. 4 is a simplified block diagram of an relay operable in accordance with the present disclosure. As shown in FIG. 4, the relay includes a wireless-client module 50 (e.g., a relay-UE component) that is configured to be served with wireless backhaul connectivity for the relay, and a relay-B S module 52 that is configured to serve end-user devices. These components are shown within a dashed box to represent that they may be integrated together or may be provided as separate but interconnected components. For instance, the components could be integrated, interconnected, or communicatively linked by a system bus, network, or other connection mechanism 54.

With this arrangement, as further shown, the wireless-client module includes a processing unit (e.g., one or more general purpose processors or specialized processors) 56, non-transitory data storage (e.g., one or more volatile and/or non-volatile storage components, such as magnetic, optical, or flash storage) 58, and program instructions 60 stored in the data storage, which could be executable by the processing unit to carry out various operations such as those discussed above.

By way of example, the operations could include, while the wireless-client module has a first wireless backhaul connection on a first carrier that has a first center frequency, determining that a threshold high probability of precipitation is forecast for a location of the first wireless backhaul connection. And the operations could include, responsive to at least the determining that the threshold high probability of precipitation is forecast for the location of the first wireless backhaul connection, but before the forecast precipitation occurs, reconfiguring the wireless-client module from having the first wireless backhaul connection on the first carrier to instead having a second wireless backhaul connection on a second carrier that has a second center frequency lower than the first center frequency, the reconfiguring being based on the second center frequency being lower than the first center frequency.

Various features discussed above can be applied in this context as well, and vice versa. For instance, the program instructions could provide for carrying out the operations during an evening maintenance period, and the forecast could be for during the day after the evening maintenance period. Further, the first center frequency could be above 24 GHz and the second center frequency could be below 6 GHz. And the act of determining that threshold high probability of precipitation is forecast for the location of the first wireless backhaul connection could involve receiving from a weather server a weather forecast for an area encompassing at least part of the location of the first wireless backhaul connection and determining, based on the received weather forecast, that the threshold high probability of precipitation is forecast for the area.

Exemplary embodiments have been described above. Those skilled in the art will understand, however, that changes and modifications may be made to these embodiments without departing from the true scope and spirit of the invention.

We claim:

1. A method for controlling wireless backhaul connectivity of a relay, the method comprising:
    while the relay is operating with a first wireless backhaul connection on a first carrier that has a first center frequency, determining that a threshold high probability of precipitation is forecast for a location of the first wireless backhaul connection; and
    responsive to at least the determining that the threshold high probability of precipitation is forecast for the location of the first wireless backhaul connection, but before the forecast precipitation occurs, reconfiguring the relay from operating with the first wireless backhaul connection on the first carrier to instead operating with a second wireless backhaul connection on a second carrier that has a second center frequency lower than the first center frequency, wherein the reconfiguring is based on the second center frequency being lower than the first center frequency.

2. The method of claim 1, carried out during an evening maintenance period, wherein the forecast is for during the day after the evening maintenance period.

3. The method of claim 1, wherein at least the reconfiguring is carried out in response to the relay being a relay rather than being another type of wireless communication device.

4. The method of claim 1, wherein reconfiguring the relay from operating with the first wireless backhaul connection on the first carrier to instead operating with the second wireless backhaul connection on the second carrier comprises:
    causing the relay to release the first wireless backhaul connection on the first carrier; and
    then causing the relay to newly establish the second wireless backhaul connection on the second carrier.

5. The method of claim 4, wherein the relay stores carrier-prioritization data that gives higher priority to the first carrier than to the second carrier, and wherein reconfiguring the relay from operating with the first wireless backhaul connection on the first carrier to instead operating with the second wireless backhaul connection on the second carrier further comprises:
    causing a change of the carrier-prioritization data to instead give higher priority to the second carrier than to the first carrier,
    wherein the newly establishing of the wireless backhaul connection on the second carrier comprises, based on the changed carrier-prioritization data, newly establishing the second wireless backhaul connection on the second carrier rather than on the first carrier.

6. The method of claim 4, wherein the relay stores allowed-carrier data indicating carriers that the relay can scan for possible connection acquisition, wherein the allowed-carrier data includes the first carrier and the second carrier, and wherein reconfiguring the relay from operating with the first wireless backhaul connection on the first carrier to instead operating with the second wireless backhaul connection on the second carrier further comprises:
    causing a change of the allowed-carrier data to exclude the first carrier.

7. The method of claim 1, wherein wireless backhaul connectivity of the relay facilitates operation of the relay on core network that includes a core-network control entity,
    wherein the determining that the threshold high probability of precipitation is forecast for the location of the relay is carried out by at least the core-network control entity, and
    wherein reconfiguring the relay from operating with the wireless backhaul connection on the first carrier to instead operating with the wireless backhaul connection on the selected second carrier comprises the core-network control entity transmitting a control message that results in the reconfiguring of the relay.

8. The method of claim 7,
    wherein the location of the relay is a tracking area encompassing the relay, and
    wherein the core-network control entity transmitting the control message comprises the core-network control entity transmitting the control message to a donor base station that serves the relay, for forwarding by the donor base station to at least the relay.

9. The method of claim 1, wherein the relay comprises a wireless-client module configured to be served with wireless backhaul connectivity for the relay, the method being carried out by at least the wireless-client module.

10. The method of claim 1, wherein the first center frequency is above 24 GHz, and wherein the second center frequency is below 6 GHz.

11. The method of claim 1, determining that the threshold high probability of precipitation is forecast for a location of the first wireless backhaul connection comprises:
    receiving from a weather server a weather forecast for an area encompassing at least part of the location of the first wireless backhaul connection; and
    determining, based on the received weather forecast, that the threshold high probability of precipitation is forecast for the area.

12. The method of claim 11, wherein determining that the threshold high probability of precipitation is forecast for a location of the first wireless backhaul connection further comprises querying the weather server to obtain the weather forecast.

13. The method of claim 1, wherein the reconfiguring of the relay is temporary, the method further comprising:

subsequently determining that a threshold high probability of precipitation is no longer forecast for the location of the first wireless backhaul connection; and responsive to at least the subsequent determining, reverting the relay to have wireless backhaul connectivity on the first carrier rather than on the second carrier.

14. A relay comprising:

a wireless-client module configured to be served with wireless backhaul connectivity for the relay; and a relay-base-station module configured to serve end-user devices, wherein the wireless-client module includes a processing unit, non-transitory data storage, and program instructions stored in the non-transitory data storage and executable by the processing unit to carry out various operations including:

while the wireless-client module has a first wireless backhaul connection on a first carrier that has a first center frequency, determining that a threshold high probability of precipitation is forecast for a location of the first wireless backhaul connection, and responsive to at least the determining that the threshold high probability of precipitation is forecast for the location of the first wireless backhaul connection, but before the forecast precipitation occurs, reconfiguring the wireless-client module from having the first wireless backhaul connection on the first carrier to instead having a second wireless backhaul connection on a second carrier that has a second center frequency lower than the first center frequency, wherein the reconfiguring is based on the second center frequency being lower than the first center frequency.

15. The relay of claim 14, wherein the processing unit is programmed to carry out the operations during an evening maintenance period, and wherein the forecast is for during the day after the evening maintenance period.

16. The relay of claim 14, wherein the first center frequency is above 24 GHz, and wherein the second center frequency is below 6 GHz.

17. The relay of claim 14, wherein determining that the threshold high probability of precipitation is forecast for a location of the first wireless backhaul connection comprises (i) receiving from a weather server a weather forecast for an area encompassing at least part of the location of the first wireless backhaul connection and (ii) determining, based on the received weather forecast, that the threshold high probability of precipitation is forecast for the area.

18. A method for controlling wireless connectivity of a device, the method comprising:

while the device is served on a first wireless connection on a first carrier that has a first center frequency, determining that a threshold high probability of precipitation is forecast for a location of the first wireless connection; and responsive to at least the determining that the threshold high probability of precipitation is forecast for the location of the first wireless connection, but before the forecast precipitation occurs, reconfiguring the device from being served on the first wireless connection on the first carrier to instead being served on a second wireless connection on a second carrier that has a second center frequency lower than the first center frequency, wherein the reconfiguring is based on the second center frequency being lower than the first center frequency.

19. The method of claim 18, wherein the first center frequency is above 24 GHz, and wherein the second center frequency is below 6 GHz.

20. The method of claim 18, wherein the reconfiguring comprises changing carrier-reselection-prioritization data that is broadcast to the device, wherein changing the carrier-reselection-prioritization data comprises changing the carrier-reselection-prioritization data from prioritizing the first carrier over the second carrier to instead prioritizing the second carrier over the first carrier.

* * * * *